United States Patent [19]

Jinno et al.

[11] Patent Number: 4,749,064
[45] Date of Patent: Jun. 7, 1988

[54] BRAKE SYSTEM FOR A WHEELCHAIR

[75] Inventors: Fukuzo Jinno, Aichi; Hisahi Furukawa, Gifu, both of Japan

[73] Assignee: Nissin Medical Industries Co., Ltd., Japan

[21] Appl. No.: 895,030

[22] Filed: Aug. 8, 1986

[30] Foreign Application Priority Data

Sep. 28, 1985 [JP] Japan ............... 60-215732

[51] Int. Cl.⁴ .................. B60T 1/04; B60T 7/08
[52] U.S. Cl. ..................... 188/2 F; 74/520; 188/74; 280/242 WC; 280/289 WC; 297/DIG. 4
[58] Field of Search ........... 188/2 F, 74, 20, 24.11, 188/24.18, 24.13, 24.22, 22.9, 29; 74/106, 520, 96; 297/DIG. 1; 280/242 WC, 289 WC

[56] References Cited

U.S. PATENT DOCUMENTS

| | | | |
|---|---|---|---|
| 508,269 | 11/1893 | Bartel | 188/24.11 |
| 910,123 | 1/1909 | Godfrey | 188/20 |
| 3,117,653 | 1/1964 | Altherr | 188/20 X |
| 3,295,861 | 1/1967 | Lull | 188/29 X |
| 4,101,143 | 7/1978 | Sieber | 188/2 F X |
| 4,350,227 | 9/1982 | Knoche | 280/289 WC X |
| 4,538,826 | 9/1985 | Lemerie | 297/DIG. 4 X |
| 4,622,798 | 11/1986 | Oki | 74/520 X |

FOREIGN PATENT DOCUMENTS

2532485 2/1977 Fed. Rep. of Germany ...... 188/2 F
41417 1/1984 Japan.

Primary Examiner—George E. A. Halvosa
Attorney, Agent, or Firm—William E. Mouzavires

[57] ABSTRACT

A brake system for a wheelchair comprises a base plate fixed to a frame of the wheelchair and a swing lever pivotally mounted to the base plate and provided with a brake member engagable with a circumferential surface of a wheel of the wheelchair. A toggle joint mechanism composed of two pivotally interconnected links is pivotally mounted to the base plate and connected to the swing lever to move the swing lever between an extended braking position and a retracted inoperative position. An operating lever is pivotally mounted to the pivot which interconnects the two links of the toggle joint mechanism. The operating lever has cam surfaces engageable with the two links to depress the latter when the operating lever is moved in either of two directions by pushing it or pulling it. Such action drives the swing lever into braking engagement with the wheel. A biasing spring is provided to urge the links of the toggle mechanism towards retracted position.

5 Claims, 7 Drawing Sheets

BRAKE SYSTEM FOR A WHEELCHAIR

BACKGROUND OF THE INVENTION

1. Field of the Invention

The present invention relates to brake systems for wheelchairs, and more particularly to a brake system which can brake a wheel by moving an operating lever in either of two directions.

2. Description of Prior Art

In such a brake system for a wheelchair as exists in the prior art, a brake operating lever is located on the side of a frame of the wheelchair, and the operating lever is movable in one direction only to thereby brake a wheel of the wheelchair (refer to Japanese U.M. publication No. 1938/1982, U.M. application laid-open No. 41417/1984). This creates a problem to some physically handicapped people who cannot operate the lever in the required direction.

OBJECTS OF INVENTION

An object of the invention is to provide a brake system for a wheelchair wherein a wheel can be braked by moving an operating lever in either of two or more directions such as by pushing the lever forward or pulling it towards the operator. Included herein is such a brake system that facilitates operation thereof by physically handicapped persons.

SUMMARY OF THE INVENTION

The above objects can be achieved in a brake system for a wheelchair wherein braking is applied to an outer circumferential surface of a wheel by operation of an operating lever arranged on one side of a frame of the wheelchair. In one embodiment the system comprises a base plate arranged and fixed on one side of the frame and a swing lever pivotally mounted to the base plate for rotation relative thereto and provided with a generally vertically extending brake member engageable with an outer circumferential surface of the wheel for braking the wheel. The swing lever is operated by a toggle joint mechanism including two links, one being pivotally mounted to the base plate and the other pivotally connected to the swing lever. The toggle links are also pivotally interconnected intermediate the ends thereof by a pivot pin about which is also pivotally mounted, an operating lever having cam surfaces engageable with the toggle links respectively. An overcenter spring biasing means is provided to bias the toggle links towards a retracted position.

If the operating lever is pushed forward or pulled towards the operator, one of the cam surfaces will engage one of the toggle links causing the two links to be depressed and extended to engage the swing lever against the wheel for braking. Preferably, a stop means is provided to control the position of the toggle links. When the operating lever is moved back towards its normal position, the spring means will cause retraction of the toggle links to remove the swing lever from the wheel to release the braking action.

DESCRIPTION OF THE PREFERRED EMBODIMENTS

Figure 1:
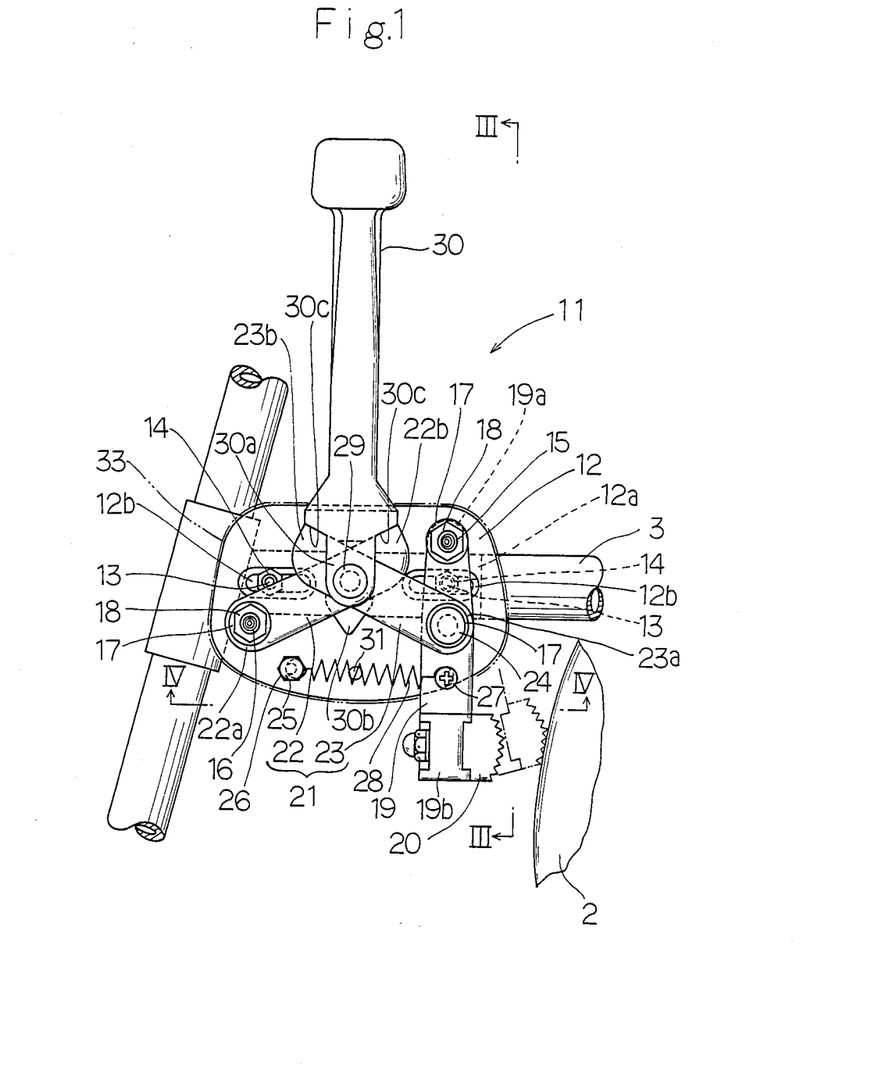
FIG. 1 is a front view of a brake system of a first embodiment of the invention.
Figure 2:
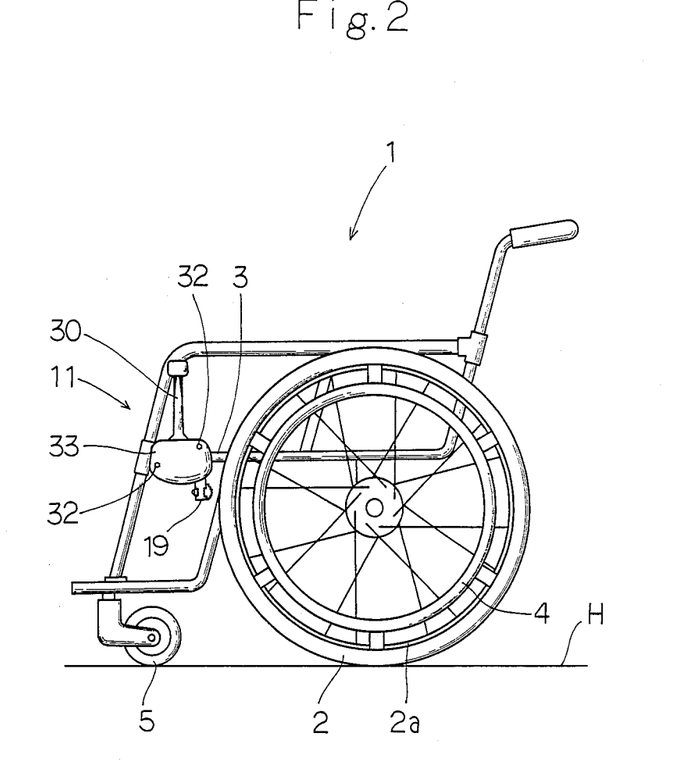
FIG. 2 is a side view of a wheelchair to which the brake system of the first embodiment is assembled.

A brake system 11 of the first embodiment shown in FIG. 1 is used for parking a wheelchair 1 shown in FIG. 2. As shown in FIG. 2, the brake system 11 is arranged on one side of a frame 3 in front of a wheel 2 with a tire attached on the outside of a rim 2a. In FIG. 2, numeral 4 designates a handrail, and numeral 5 a truck wheel.

Figure 3:
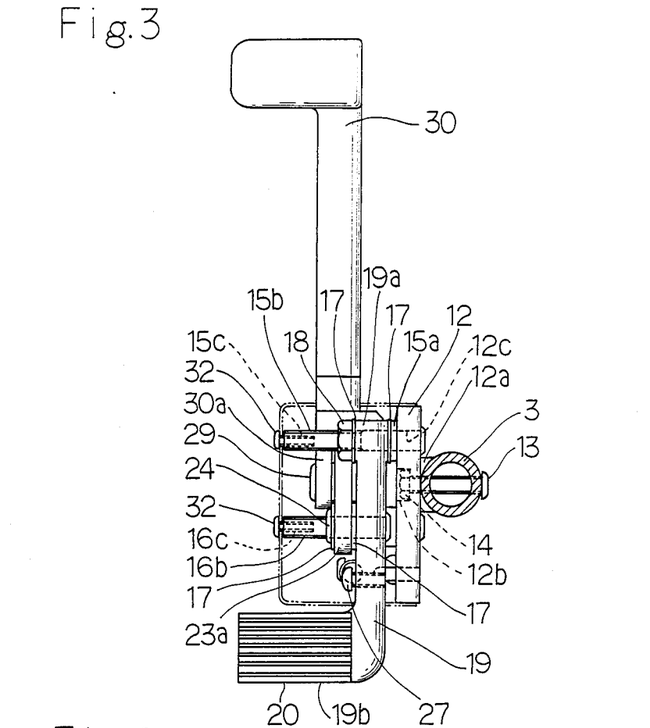
FIG. 3 is a sectional view taking along line III—III of FIG. 1.
Figure 4:
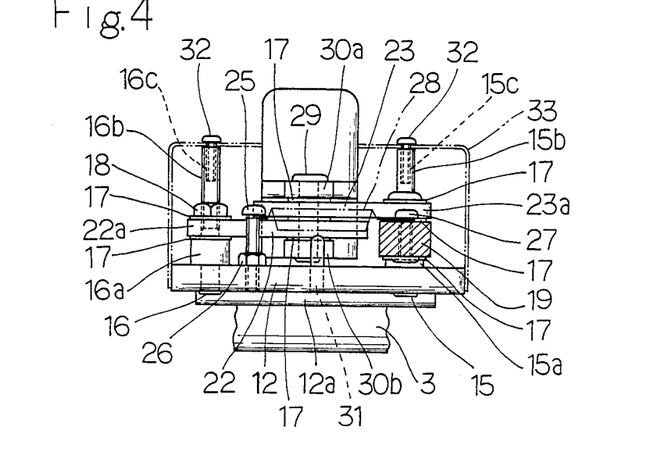
FIG. 4 is a sectional view taken along line IV—IV of FIG. 1.
Figure 5:
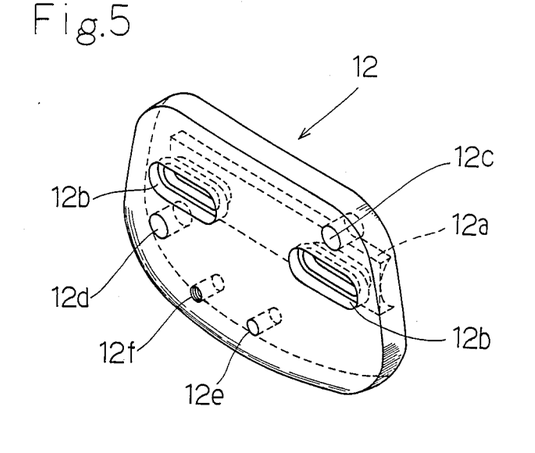
FIG. 5 is a perspective view of a base plated included in the first embodiment.

The brake system 11 comprises a base plate 12 of generally a flat or planar form, and an abutting member 12a with an arcshaped recess at its rear side engaged on the frame 3 (refer to FIGS. 1, 3 and 4). As shown in FIG. 5, the base plate 12 is provided with two oval holes 12b, 12b having a stepped portion on the front side thereof. Plate 12 also has three through holes 12c, 12d, 12e bored therethrough from one side to the other thereof in predetermined positions, and a tapped hole 12f formed in a predetermined position. A screw 13 extends through the frame 3 and plate portion 12a; and a nut 14 is threadably attached on screw 13 within the oval hole 12b to thereby secure the base plate 12 on one side of the frame 3 in a generally vertical plane.

A pin 15 extends through hole 12c of base plate 12 and a hole formed in a swing lever 19 to mount the latter for rotation about pin 15 in a generally vertical plane. One side of swing lever 19 abuts a flange 15a formed on pin 15 while the other side is engaged by a nut 18 threadably engaged on male screw threads 15b formed on pin 15. Washers 17 are preferably provided on the pin 15 between the lever 19 and the flange 15a and nut 18. The swing lever 19 is thus rotatably mounted and arranged in parallel to the base plate 12.

One end of the swing lever 19 has a brake member 19b with a brake shoe 20 projecting therefrom such that when the swing lever 19 is rotated rearwardly, the brake shoe 20 engages the outer circumferential surface of the wheel 2 to brake the wheel 2.

A screw 25 is threadably engaged in the threads of the tapped hole 12f of base plate 12. Screw 25 is adjusted in length by a nut 26. Between the screw 25 and another screw 27 threadably engaged with the swing lever 19, is stretched a tension coil spring 28 to bias the swing lever 19 away and spaced from the outer circumferential surface of the wheel 2.

A pin 16 is fixed through hole 12d of the base plate 12. The pin 16 has a flange 16a formed adjacent one end and male screw threads 16b on the opposite end (refer to FIGS. 1, 4). A nut 18 is threadably engaged with the male screw threads 16b, and a link 22 is mounted through an apertured portion 22a thereof about pin 16 between nut 18 and flange 16a and washers 17, 17 associated therewith. A link 23 is connected to an intermediate portion of the swing lever 19 by a rivet 24, which extends through an apertured portion 23a of link 23 and through washers 17, so that it is rotatable with respect to the swing lever 19. Links 22 and 23 intersect each other at an oblique angle and are pivotally connected by a rivet 29. A toggle joint mechanism 21 is thus formed and biased to the position shown in FIG. 1 by means of the tension spring 28 acting through lever 19.

Figure 6:
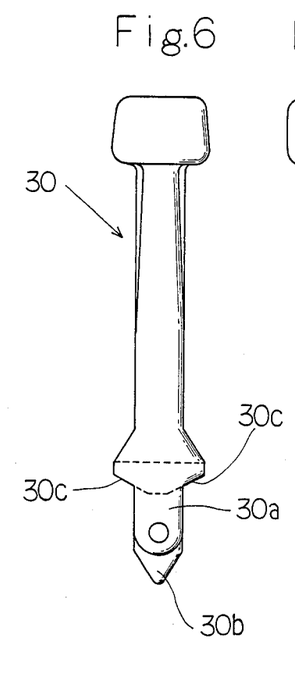
FIG. 6 is a front view of an operating lever included in the first embodiment.
Figure 7:
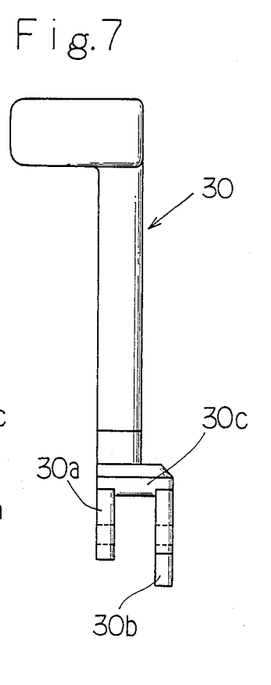
FIG. 7 is a side view of the operating lever included in the first embodiment.

The lower end 30a of an operating lever 30 (shown in FIGS. 6, 7) is pivotally mounted about the rivet 29 to which the two links 22, 23 in the toggle joint mechanism 21 are pivotally mounted. The operating lever 30 has at its lower end, a U-shaped yoke 30a pivotally mounted about the rivet 29 through aligned apertures in the yoke 30a so as to operate the links 22, 23. One of the arms of the yoke 30a is tapered downwardly to form a triangular projection 30b.

Operating lever 30 is provided above the yoke 30a with angular cam surfaces 30c, 30c to be engageable with the top edge surfaces 22b, 23b of the links 22, 23 to depress the links 22, 23 when the operating lever is pivoted in either of the two directions (shown by arrows in FIG. 8) about rivet 29. Such movement is against the bias of spring 28 and serves to apply the brake shoe 20 against the wheel 2. When the operating lever 30 is moved towards the normal position, spring 28 returns the lever 30 to the neutral position shown in FIG. 1 where the brake shoe 20 is released from wheel 2. During operation of the operating lever 30, the latter is depressed and the lower projection 30b of the operating lever 30 abuts a stop pin 31 fixed in the hole 12e in the base plate 12.

Referring to FIG. 4, a cover 33 is attached by male screws 32 threadably engaged in female screws 15c, 16c formed in the ends of pins 15, 16 thereby enclosing the links. The cover 33 is provided with an aperture in the top thereof through which the operating lever 30 and the swing lever 19 extend without obstruction.

Figure 8:
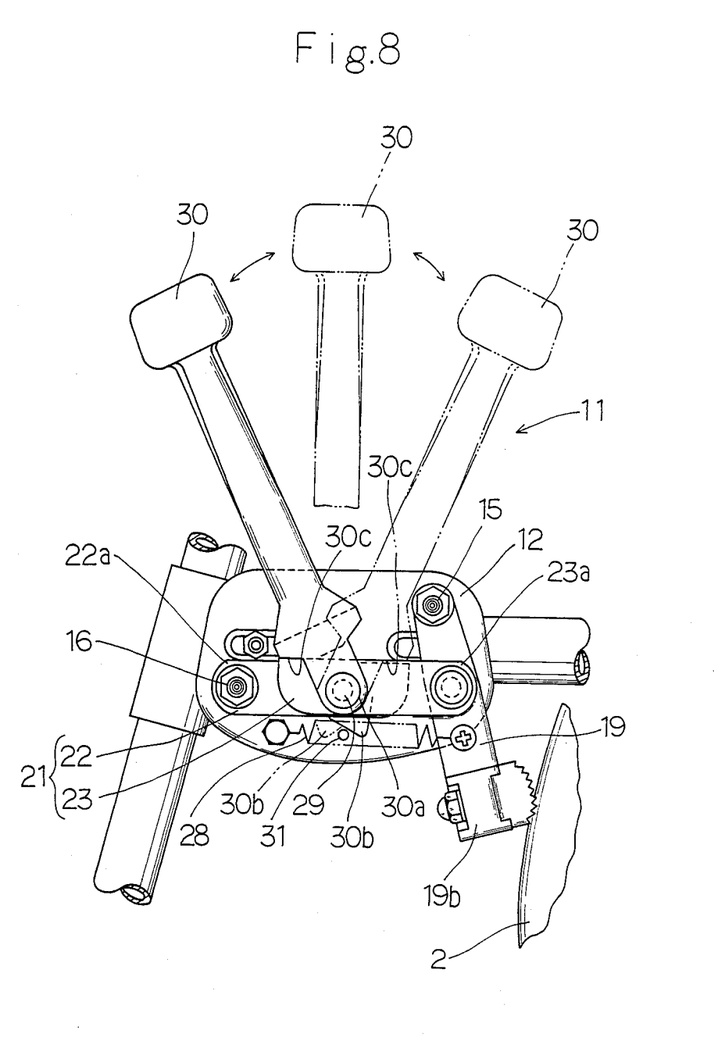
FIG. 8 is a front view illustrating a use mode of the first embodiment.

Operation of the brake system 11 will be described. As shown in FIG. 8, the operating lever 30 is pushed forward or pulled towards the operator so that it will extend at an angle. This causes the operating lever 30 to depress the two links 22, 23 in the toggle joint mechanism 21 by lever action about a fulcrum at 29 and through engagement with one of the surfaces 30c of the operating lever 30 with one of the top edge surfaces of the links 22 and 23. Consequently, the two links 22, 23 which normally extend at an angle, are pivoted and extended in a horizontal direction and slightly beyond "center" where links 22, 23 extend slightly downward from their pivot axes 16 and 24. However, the projection 30b on lever 30 abuts the pin 31 to maintain the links 22, 23 in the proper extended position for rotating swing lever 19 towards wheel 2 to engage the brake shoe 20 with the wheel 2. In this condition, the links 22, 23 are beyond or over center, meaning that the pivot 29 interconnecting the links is below a line passing through pivots 16 and 24. However, since the projection 30b of the operating lever 30 abuts on the stop pin 31 the force of spring 28 is prevented from pivoting the links 22, 23 toward retracted position even if operating lever 30 is released. The links 22, 23 and operating lever 30 are thus maintained in the braking mode.

In order to release the brake action on the wheel 2, operating lever 30 is pulled towards the operator or pushed forward away from the operator so that it is restored to the original state. Operating lever 30 thus elevates the rivet or pivot 29 using the projection 30b abutting on the pin 31 as a fulcrum and the pivot 29 as an action point. In this case, the links 22, 23 are elevated above center, and then the swing lever 19, the links 22, 23 and the operating lever 30 are restored to the original position by the force of the spring 28. Consequently, the wheel 2 is released from the brake action.

Accordingly, in the brake system 11 of the first embodiment, since the wheel 2 can be braked even if the operating lever 30 is moved in either of plural directions by pushing forward away from or pulling toward the operator, the brake can be used by various physically handicapped persons.

In the description of the brake system 11 of the first embodiment, during operation of the operating lever 30, the projection 30b abuts on one pin 31 projecting from the base plate 12 and is stopped. However, as shown in the brake system 41 of FIGS. 9 and 10 as a second embodiment of the invention, two pins 311, 312 spaced by a predetermined distance on the base plate 12 may also be used.

Figure 9:
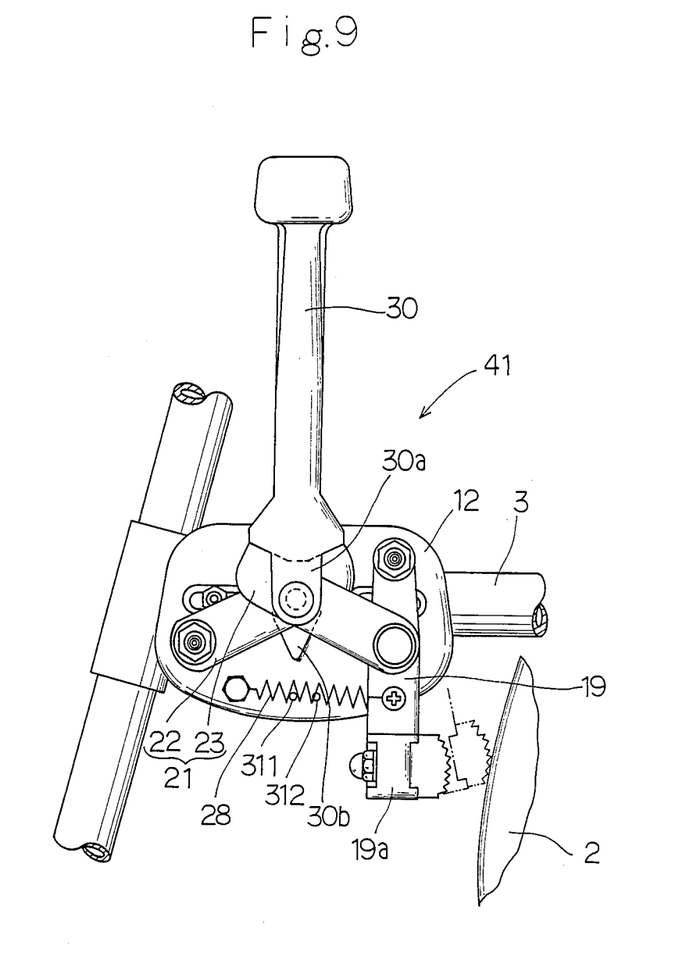
FIG. 9 is a front view of a brake system of a second embodiment of the invention.
Figure 10:
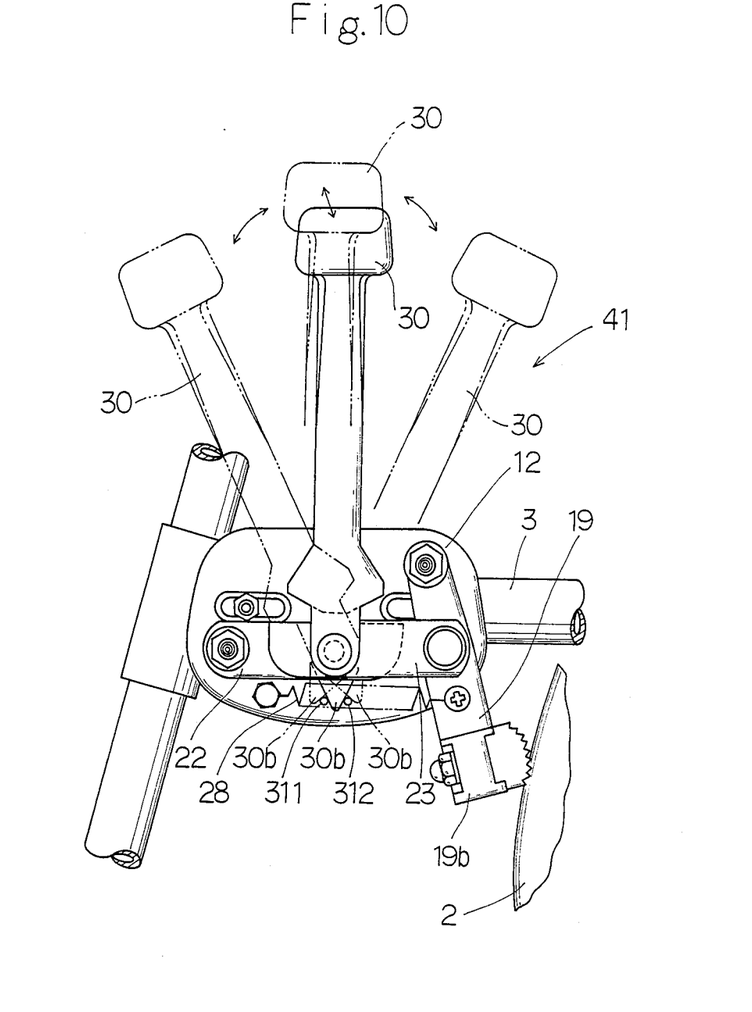
FIG. 10 is a front view illustrating the use mode of the second embodiment.

These pins 311, 312 are arranged so that, during operation of the operating lever 30 to inclined position, when the links 22, 23 move beyond center and are lowered slightly, the projection 30b of the operating lever 30 abuts on one of the pins 311, 312. Also these pins 311, 312 are arranged so that, when the operating lever 30 is simply depressed straight downward and the links 22, 23 move beyond center and are lowered slightly, the top end of the projection 30b is inserted between the two pins 311, 312 and abut on both pins 311, 312.

In this condition, the two links 22, 23 are extended in the generally horizontal direction and the swing lever 19 has been rotated to abut brake member 19b on the wheel 2. Consequently, with the brake system 41, the wheel 2 can be braked not only by pushing the operating lever 30 forward or pulling it towards the operator but also by depressing it straight down.

Both brake system 11 and 41 of the first and second embodiments are for parking the wheelchair 1. Consequently, in the brake systems of both embodiments, the operating lever 30 is provided with the projection 30b, and the base plate 12 is provided with the pins 31, 311, 312 for abutting the projection 30b and stopping it during operation of the operating lever 30. As another embodiment (not shown), however, if the brake member 19b of the swing lever 19 is constituted to abut on the outer circumferential surface of the wheel 2 within the range where the links 22, 23 do not move beyond center during the operation of the operating lever 30, the brake member 19b may be used also as a brake for the wheelchair 1 during operation of the wheelchair without requiring the projection 30b and the pins 31, 311, 312.

With this embodiment, if the hand is separated from the operating lever 30 during operation, the operating lever 30 is automatically restored to the original position by the force of the spring 28 and therefore the wheel 2 is released from brake action. Also this embodiment is more preferable from the standpoint of durability since the brake shoe abuts the outer circumferential surface of the tire of the wheel 2 rather than the outer circumferential surface of the rim 2a of the wheel 2.

We claim:

1. A brake system on a wheelchair, the system comprising in combination a base member fixed to a frame of an associated wheelchair, a swing lever pivotally mounted to the base member for movement into and out of engagement with the wheel of an associated wheelchair, a toggle linkage for operating the swing lever between said positions thereof, the toggle linkage including a first link pivotally mounted to the base member, a second link pivotally connected to the swing lever, pivot means pivotally interconnecting said first and second links for movement between a retracted inoperative position and an extended braking position, said links including cam surfaces respectively located on opposite sides of said pivot means, an operating lever pivotally mounted by said pivot means for movement about said pivot means in opposite directions on said pivot means, said operating lever having cam surfaces engageable with said cam surfaces of said first and second links respectively upon pivotal movement of said operating lever in either of two opposite directions about said pivot means to move said first and second links to said extended position, and means biasing said first and second links towards said retracted position.

2. The brake system defined in claim 1 further including a fixed stop on said base member and engageable with the operating lever to limit movement of said first and second links when actuated by said operating lever to the extended position.

3. The brake system defined in claim 1 further including two fixed stops on said base and engageable with opposed surfaces on said operating lever to limit movement of said first and second links when actuated by said operating lever to the extended position.

4. The brake system defined in claim 1 wherein said means biasing said first and second links includes a tension spring having one end anchored to said base member and an opposite end connected to said swing lever.

5. The brake system defined in claim 1 wherein said first and second links are movable by said operating lever to an overcenter position, and wherein there is further included stop means for limiting movement of said first and second links when in overcenter position, and a biasing means for urging said first and second links towards retracted position.

* * * * *